United States Patent
Patel et al.

(10) Patent No.: US 6,747,692 B2
(45) Date of Patent: Jun. 8, 2004

(54) PORTABLE MULTIPURPOSE RECORDING TERMINAL AND PORTABLE NETWORK SERVER

(75) Inventors: Mehul Patel, Commack, NY (US); Jerome Swartz, Old Field, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 08/827,263

(22) Filed: Mar. 28, 1997

(65) Prior Publication Data

US 2001/0043273 A1 Nov. 22, 2001

(51) Int. Cl.$^7$ .............................................. H04N 5/232
(52) U.S. Cl. ............................ 348/211.2; 348/231.99; 348/207.1
(58) Field of Search ..................... 395/200.48, 200.49, 395/200.59, 200.71; 709/218, 219, 229, 239, 241; 348/207, 552, 220, 221, 335, 358, 370, 371; 235/470, 472.01; 340/541, 545.2; 455/419, 403, 414; H04N 5/225

(56) References Cited

U.S. PATENT DOCUMENTS

| 15,486 A | 8/1856 | Hannay |
| 3,636,317 A | 1/1972 | Torrey |
| 3,647,275 A | 3/1972 | Ward |
| 3,676,644 A | 7/1972 | Vaccaro et al. |

(List continued on next page.)

FOREIGN PATENT DOCUMENTS

| EP | 0130953 | 1/1985 |
| EP | 0405099 | 1/1991 |
| EP | 0 529 721 B1 | 10/1997 |
| EP | 0 723 687 B1 | 8/1998 |
| JP | 59-44157 | 3/1984 |
| JP | 62-91075 | 5/1987 |

OTHER PUBLICATIONS

IBM Technical Disclosure Bulletin, "Distributing Uniform Resource Locators as Bar Code Images," vol. 39, No. 1, p. 167, Jan. 1996.
M. Hahn, EDPACS, "Uniform Resource Locators," vol. 23, No. 6, pp. 8–13, Dec. 1995.
H. Shrikumar et al., Computer Networks and ISDN Systems, "Thinternet: Life at the End of a Tether," vol. 27, No. 3, pp. 375–385, Dec. 1994.
B.N. Schilit et al., Computer Networks and ISDN Systems, "TeleWeb: Loosely Connected Access to the World Wide Web," vol. 28, No. 11, pp. 1431–1444, May 1996.
French Search Report, Aug. 25, 1998.
"Something has happened to paper that you can't ignore," Softstrip International marketing brochure, 1986.
"Apprentice Yesterday, Master Today: Softstrip Is Users' Super–Hero," *IDSystems*, vol. 8, No. 6, pp. 31–34, Jul. 1988.
"Introducing SOFTCARD," Automatic I.D. News Action Card Deck, Jul. 1989.
"Introducing SOFTCARD" advertisement, *Automatic I.D. News*, p. 102, Oct. 1989.
"Technologia Softstrip" Italian marketing material, Oct. 1990.
"Uses of Softstrips," Key Strip marketing material, 1990.
"SOFTSTRIP," English translation of Soft–Data Italian marketing brochure, 1990.
"Softstrip: Data Card Reader System," Key Strip marketing material, 1991.

Primary Examiner—Tuan Ho
(74) Attorney, Agent, or Firm—Kirschstein, et al.

(57) ABSTRACT

A data terminal includes a digital camera for capturing an image and data processing/storage/encoding means for processing the image information, together with an internal server for creating a web site at the terminal displaying the image. As a result high resolution image information is immediately accessible to authorized users and instantly recorded.

4 Claims, 8 Drawing Sheets

U.S. PATENT DOCUMENTS

| | | |
|---|---|---|
| 3,761,683 A | 9/1973 | Rogers |
| 3,812,328 A | 5/1974 | Tramposch |
| 4,141,078 A | 2/1979 | Bridges, Jr. et al. |
| 4,318,090 A | 3/1982 | Narlow et al. |
| 4,568,936 A | 2/1986 | Goldman |
| 4,583,083 A | 4/1986 | Bogasky |
| 4,654,718 A | 3/1987 | Sueyoshi |
| 4,654,793 A | 3/1987 | Elrod |
| 4,660,221 A | 4/1987 | Dlugos |
| 4,689,477 A | 8/1987 | Goldman |
| 4,794,239 A | 12/1988 | Allais |
| 4,821,186 A | 4/1989 | Munakata et al. |
| 4,835,372 A * | 5/1989 | Gombrich et al. .......... 235/375 |
| 4,835,713 A | 5/1989 | Pastor |
| 4,863,196 A | 9/1989 | Ohnishi et al. |
| 4,868,375 A | 9/1989 | Blanford |
| 4,893,333 A | 1/1990 | Baran et al. |
| 4,908,873 A | 3/1990 | Philibert et al. |
| 4,934,846 A | 6/1990 | Gilham |
| 4,939,354 A | 7/1990 | Priddy et al. |
| 4,947,261 A | 8/1990 | Ishikawa et al. |
| 4,949,381 A | 8/1990 | Pastor |
| 4,972,476 A | 11/1990 | Nathans |
| 4,973,829 A | 11/1990 | Ishida et al. |
| 4,975,948 A | 12/1990 | Andresen et al. |
| 5,083,218 A | 1/1992 | Takasu et al. |
| 5,206,818 A | 4/1993 | Speranza |
| 5,225,996 A | 7/1993 | Weber |
| 5,262,867 A * | 11/1993 | Kojima ........................ 348/39 |
| 5,301,243 A | 4/1994 | Olschafskie et al. |
| 5,331,547 A | 7/1994 | Laszlo |
| 5,356,594 A | 10/1994 | Neel et al. |
| 5,360,967 A | 11/1994 | Perkin et al. |
| 5,479,359 A | 12/1995 | Rogero et al. |
| 5,482,678 A | 1/1996 | Sittler |
| 5,526,287 A | 6/1996 | French |
| 5,535,136 A | 7/1996 | Standifer |
| 5,566,088 A | 10/1996 | Herscher et al. |
| 5,574,804 A | 11/1996 | Olschafskie et al. |
| 5,578,834 A | 11/1996 | Trobridge |
| 5,595,445 A | 1/1997 | Bobry |
| 5,610,730 A * | 3/1997 | Osipchuk .................... 358/494 |
| 5,663,808 A | 9/1997 | Park |
| 5,719,785 A | 2/1998 | Standifer |
| 5,729,452 A | 3/1998 | Smith et al. |
| 5,732,219 A * | 3/1998 | Blumer et al. ......... 395/200.57 |
| 5,754,227 A * | 5/1998 | Fukuoka ..................... 348/552 |
| 5,774,372 A | 6/1998 | Berwanger |
| 5,799,219 A | 8/1998 | Moghadam et al. |
| 5,805,474 A * | 9/1998 | Danielson et al. ....... 364/708.1 |
| 5,808,672 A * | 9/1998 | Wakabayashi et al. ...... 348/220 |
| 5,816,725 A * | 10/1998 | Sherman et al. ............ 235/472 |
| 5,818,528 A * | 10/1998 | Roth et al. .................. 348/364 |
| 5,821,523 A * | 10/1998 | Bunte et al. ................. 235/472 |
| 5,835,871 A | 11/1998 | Smith et al. |
| 5,837,987 A | 11/1998 | Koenck et al. |
| 5,839,094 A | 11/1998 | French |
| 5,869,840 A * | 2/1999 | Helton .................. 235/472.01 |
| 5,898,600 A * | 4/1999 | Isashi ......................... 348/207 |
| 6,039,258 A * | 3/2000 | Durbin et al. ......... 235/472.01 |
| 6,094,135 A * | 7/2000 | Sugimoto et al. ........... 340/541 |
| 6,108,617 A | 8/2000 | Schomer |
| 6,111,604 A * | 8/2000 | Hashimoto et al. ...... 348/220.1 |
| 6,144,848 A * | 11/2000 | Walsh et al. ................ 455/419 |

\* cited by examiner

PORTABLE MULTIPURPOSE RECORDING TERMINAL AND PORTABLE NETWORK SERVER

BACKGROUND OF THE INVENTION

This application is related to U.S. application Ser. No. 08/691,263 commonly assigned herewith.

1. Field of the Invention

The invention relates to a portable computing device or terminal, and in particular a device arranged to link up to the Internet or a private computer network.

2. Description of the Related Art

The Internet computer network is gaining ever increasing significance in the world of science, technology, information and commerce amongst many others. The Internet will be well known to the skilled reader but, in brief summary, comprises a network of computers practically worldwide and accessible from any access point suitably linked to retrieve information contained in the Internet. Various sub-networks exist within the Internet, one of the best known of which is the worldwide web.

Information is commonly stored on the Internet in the form of "pages" often comprising a "home page" relating to a general site and providing guidance and access to the contents at that site, the contents being contained in "sub-pages". A site includes a unique Internet Protocol address or Universe Resource Locator (URL). The site can thus be accessed from any access point to the Internet by entering the relevant address and displaying the site held at that address. The user accesses the Internet via a client computer, for example a PC linked to the Internet. The link will typically be via a modem and telephone line and a service provider or server acts as intermediary, the client accessing the Internet via the server. In addition, the server allows the user to set up an Internet site. It will be appreciated that the server generally comprises a fixed station. Such an arrangement can give rise to an unnecessary level of inflexibility. In particular it is often time consuming and unnecessarily complex to have to access the fixed station server to set up or access an Internet site.

Various developments to Internet related systems have been disclosed in U.S. patents. For example U.S. Pat. No. 5,550,984 relates to a security system for connecting computer networks, U.S. Pat. No. 5,544,162 relates to a bridge for connecting parallel processors to the external environment, U.S. Pat. No. 5,517,494 relates to a routing protocol for multicast messages across the Internet, U.S. Pat. No. 5,416,842 relates to message transmission between firewall servers, U.S. Pat. No. 5,410,754 relates to an interface between a wire line carrier and a remote host on a Local Area Network (LAN), U.S. Pat. No. 5,400,335 relates to an Integrated Services Digital Network (ISDN)—LAN connection terminal, U.S. Pat. No. 5,353,283 relates to packet transmission across a series of modes in a network, U.S. Pat. No. 5,351,237 relates to a network of LAN's connected to an ISDN including a plurality of routers/sub-routers. U.S. Pat. No. 5,309,437 relates to a bridge-type device for coupling segments of an extended LAN, U.S. Pat. No. 5,289,468 relates to a terminal adapter for connecting a LAN and a Wide Area Network (WAN) using an Internet Standard Protocol, U.S. Pat. No. 5,276,789 relates to graphically displaying computer network topology, U.S. Pat. No. 5,229,988 relates to a system for classifying duplicate source address replies, U.S. Pat. No. 5,185,860 relates to a system for determining the nodes connected to a computer network and U.S. Pat. No. 5,166,931 relates to a system for an inter-network arranged to simplify the network addressing system. U.S. Pat. No. 5,442,633 relates to a method for routing a data packet between a mobile host and a destination host via a wireless link between the mobile host and a base station. The base station acts as a physical location of the mobile host and is linked to the network via a LAN sub-network.

The mechanism of file name translation across a distributed network are known, for example, from U.S. Pat. No. 5,483,652, incorporated herewith by reference.

A range of products have been developed by Spyglass Inc. enhancing the Internet connectivity of existing devices. In particular these products are designed to connect electronic products to the worldwide web such as cellular phones, cable T.V. set-top boxes, televisions, personal digital assistants and pagers, providing the infrastructure, applications and services to allow these devices browsing capability across the Internet. One such product is available under the trade mark REMOTE MOSAIC which converts browsing into a client service operation in which lightweight "viewers" are custom-integrated into devices which connect to a "proxy browser" on a remote server. The proxy browser handles applications demanding excessive process or memory capabilities such as caching and connects the device to other servers.

In another aspect there are numerous situations in which an instantaneous image of a scene or object is of considerable use and importance, for example in insurance claims documentation where it is vital to document as accurately and completely as possible the circumstances against which the insurance claim is made. Conventionally details are documented either in writing or by taking photographs using a film camera. This information is then subsequently entered with all other information relating to the insurance claim. Such a system is time consuming and error-prone, in particular because of the subsequent re-entry of information and transfer of the physical photograph to the relevant file. Similar problems arise, for example, in news coverage of an incident, police or other authorities' incident reports and so forth.

U.S. Pat. No. 5,583,994 relates to a multimedia information delivery network system. A wide area transmitter transmits the multimedia programs which are received by a plurality of network servers for re-transmission to downstream network servers or a user. The programs are cached at the network servers as determined by a scheduler for efficient delivery of the multimedia program to each user.

In another aspect, data terminals connected to the Internet are conventionally required to download applets in an appropriate agent implementation language from a host which is a complex and slow process.

SUMMARY OF THE INVENTION

Objects of the Invention

It is an object of the present invention to avoid, mitigate or overcome the problems associated with prior art arrangements.

It is a further object of the invention to provide an improved data device interconnection with the Internet.

Features of the Present Invention

According to the present invention there is provided a data terminal connectable to, and remote from, the Internet comprising a data input and an internal server for creating an Internet site representing the input data and having an Internet Protocol address, the terminal further comprising a network link cooperating with the server to provide access to the site to users elsewhere on the Internet. The system thus provides substantial benefits as regards speed, efficiency and accessibility.

The Internet site may be a web site. The data input may comprise one or more of the group of image recordal means, sound recording means, or text recordal means. The network link may be a wireless network link comprising one of the group of a radio frequency link, an infrared IRDA standard link or a microwave link over a private wireless local area network, or a cellular telephone network.

According to the present invention there is provided a data terminal connectable to, and remote from, a data network comprising a data input, means for creating a user accessible data site representing the input data and having a site address and a network link arranged to receive access requests from users elsewhere on the network addressed to the site, and provide access to the addressed site.

The network may comprise one of the group of the Internet, an Intranet or a Local Area Network (LAN), for example the network comprising the Internet and the site address comprising an Internet Protocol address. The site comprises a Web site.

The data input may comprise one of the group of image recordal means, sound recordal means or text recordal means, or even a chemical "sniffer" which detects the presence of certain chemicals in the air (e.g. natural gas, or other combustible or hazardous fumes). The data site creation and access means may comprise a server internal to the terminal. The network link may be a wireless link comprising one of the group of a radio frequency link, an infrared IRDA standard link or a microwave link.

According to the invention there is provided a mobile image recording unit connectable to the Internet via a wireless link comprising image recordal means, a server for creating an Internet site having an Internet Protocol address and representing the recorded image and a wireless link arranged to provide site access to requests directed to the site address.

The server may create respective sub-pages for respective recorded images and includes a menu setting out the sub-pages on a home page at the site address.

According to the invention there is provided an Internet site creation and access system comprising a mobile unit including a server arranged to record images at a given geographical location and create a site representing the image internal to the terminal, wherein the mobile unit communicates with the Internet via a wireless link and users access the site at the mobile unit via the Internet.

According to the invention there is provided a method of creating a web site in which a mobile unit records data relating to its immediate environment, a server within the mobile unit creates a web site page representing the data and having an Internet Protocol address, and Internet users access the web site at the Internet Protocol address via a wireless link between the mobile unit and the Internet.

According to the invention there is provided an image capture and relay system comprising a remote still image capture device including an encoder for encoding the captured image as an image data signal and a transmitter for transmitting the image data signal, the system further comprising a base station for receiving the image data signal and providing access to the image data. As a result, prompt access to the image is allowed at the base station.

The image capture device may comprise a digital camera and many further include a bar code reader and/or a microphone and/or a user data input device and/or include a printer, preferably arranged to print bar code symbols or a hard copy version of the captured image.

The image capture device may include a visual display screen and, advantageously means for altering an image displayed on the visual display screen.

According to the invention there is further provided a still image capture device comprising a digital camera, an encoder for encoding the still image as an image data signal, and a transmitter for transmitting the image data signal by wireless transmission to a remote base station.

According to the invention there is further provided a method of capturing and relaying an image comprising the steps of capturing the image using a remote image capture device, encoding the captured image as an image data signal and transmitting the image data signal, the encoder and transmitter being provided in the remote image capture device, and receiving the transmitted image data signal in a base station for distributing the image. The image captured may relate to a given incident and the base station may transfer the received image to an insurance database relating to the incident.

The image captured may relate to the condition of goods prior to delivery and the received image may be transferred from the base station to a delivery point for comparison with the received goods.

The image captured may relate to the condition of goods to be delivered, the image data signal may be encoded as a bar code symbol applied to the goods to be delivered, and the bar code symbol may be decoded at the point of delivery for comparison of the captured image with the condition of the goods as received.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which.

DETAILED DESCRIPTION OF THE REFERRED EMBODIMENTS

Figure 1:
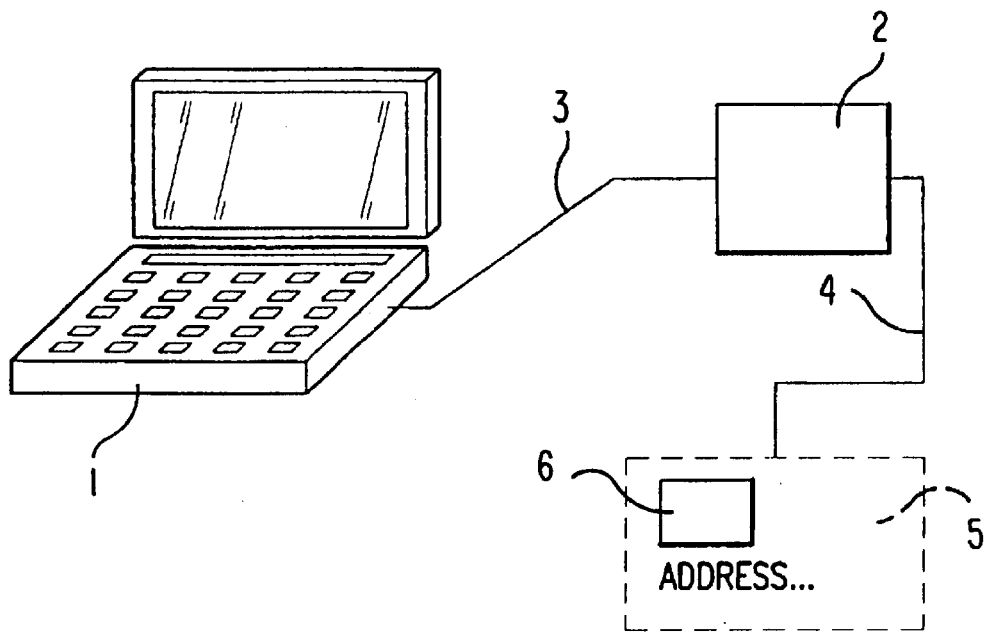
FIG. 1 shows a terminal according to the present invention arranged to link with the Internet.

A conventional Internet link is shown referring to the schematic diagram at FIG. 1, and block diagram of FIG. 2 and includes a remote terminal data device 1 comprising, for example, a lap-top computer, a PC or a mobile unit as discussed in more detail below linked to a server 2 via a suitable link 3 which can be a telephone link, incorporating a suitable modem, a wireless link or a cellular telephone link amongst other possibilities which will be evident to the skilled person. The server 2 is in turn interconnected via line 4 to the Internet shown schematically at 5. When the user wishes to access a web site the web site address is entered at terminal 1 and server 2 brings up the web site 6 at the given address from the Internet 5. Similarly when the user wishes to create a site, the relevant information is entered at terminal 1 and the site is created via server 2.

Figure 2:
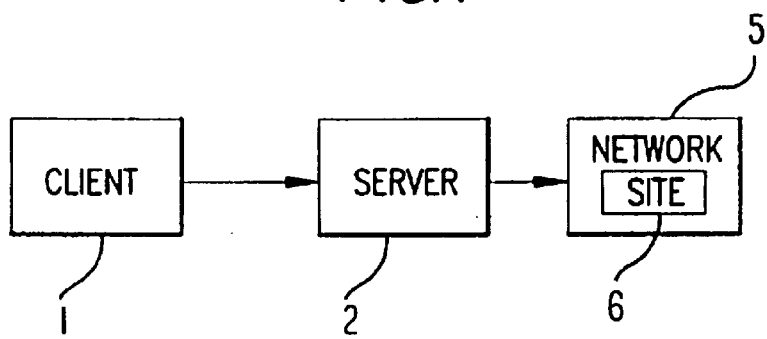
FIG. 2 shows a block diagram of the connection system shown at FIG. 1.

Whilst the system shown in FIG. 1 allows centralised site access and creation, it will be appreciated in certain circumstances the system is cumbersome, for example where it is desired to create a site very quickly. In addition, whereas in some circumstances a user will simply know what information is sought, and will "browse" through the Internet to find a site containing that information, in some circumstances the user may be entirely aware of the exact site which he wishes to access irrespective of the information contained at the site. In that case the centralised system shown in FIG. 1 can give rise to unnecessary delays.

Figure 3:
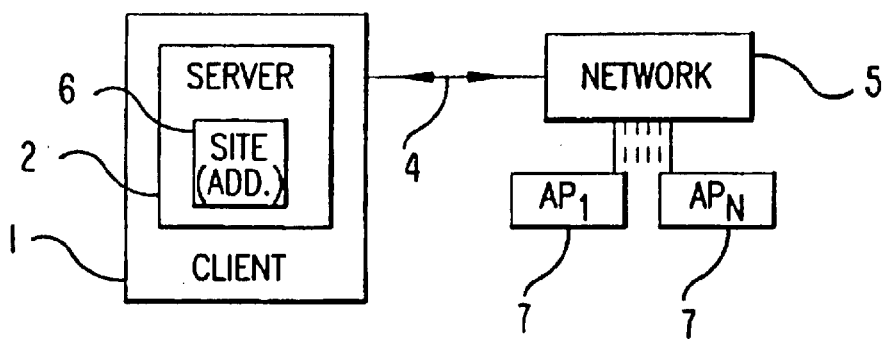
FIG. 3 shows an alternative configuration according to the present invention.

An improved system according to the present invention is shown as a block diagram in FIG. 3. Briefly within the client terminal 1 itself suitable server software 2 is retained. Accordingly the client is able to create an Internet site directly, the Internet site 6 being stored at the server again directly at the terminal 1. The client/server then accesses the Internet 5 via a line or wireless link 4. As is well known, the Internet can be accessed generally by access points $AP_1$ to $AP_N$.

As a result the invention allows a Internet site such as a web site to be set up at the terminal without the requirement of accessing a dedicated server, as appropriate server software is included at the client terminal. When a third party wishes to access the site, they will have or be able to obtain details of the client server address and can thus access the client server via the Internet.

A particular implementation of the invention arises in relation to client/servers provided in remote, mobile terminals communicating with the Internet via an access point with which it is in wireless communication. In that case data is entered at the mobile unit, generally relating to the physical environment at which the mobile unit is presently located such as an image of the surrounding scene. Users wishing to access that data merely need the client/server address. The address is entered at the relevant access point to the Internet and the site is pulled up directly from the client/server. It will be seen that the client/server can include a home page which is actually pulled by the user, the specific sub-pages at the site being accessible via the home page, once the home page has been accessed.

Figure 5:
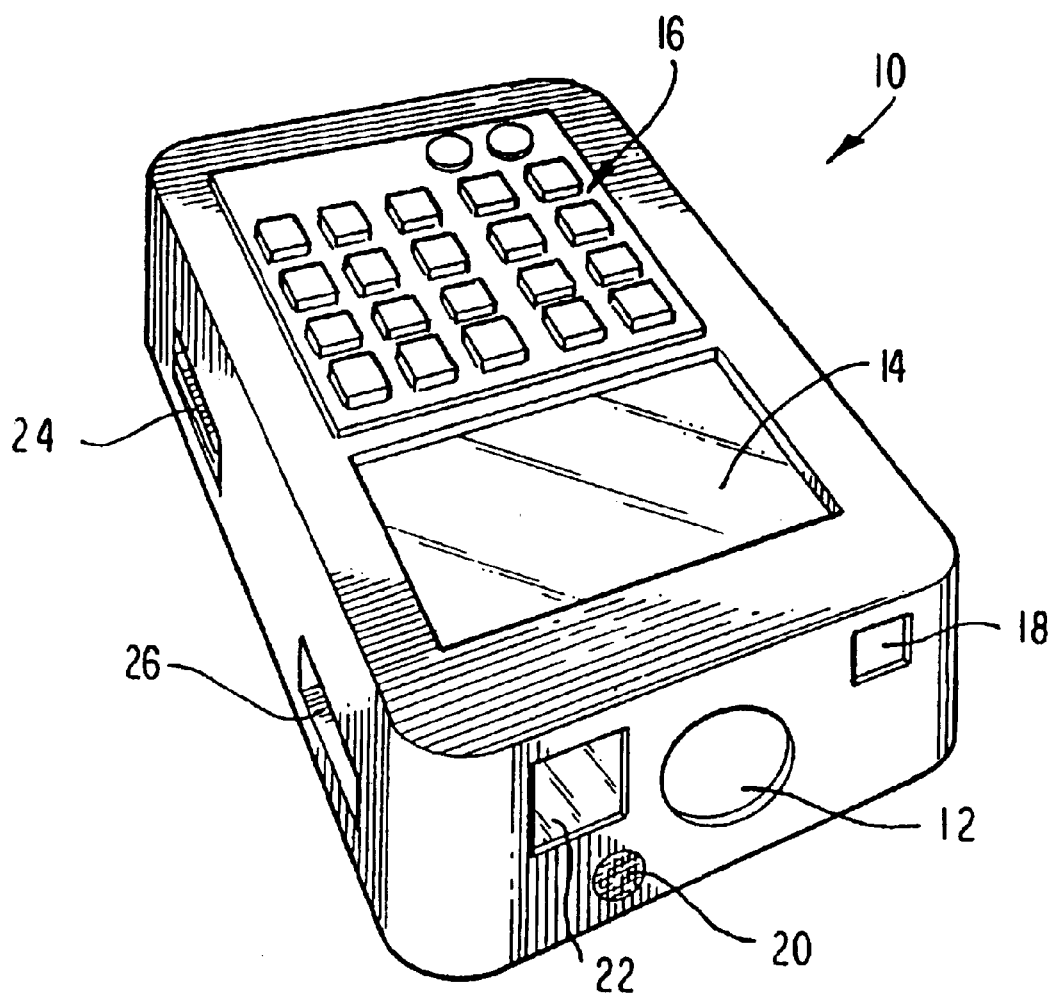
FIG. 5 is a perspective view of a data terminal according to the present invention.

The system can use a data terminal of the type designated generally 10 in FIG. 5. The central elements to the data terminal 10 comprises a digital camera having a lens 12 and a wireless Internet link 18.

Digital cameras are well known and the detailed structure will be apparent to the skilled man such that a detailed description is not required here. Briefly, however, the digital camera includes a lens system 12 for focusing an image onto a CCD (charge coupled device) array. The image is thus pixelised and encoded, for example as a bit stream. The encoded signal is decoded and displayed on a visual display screen 14 or output as hard copy. A "still" image is obtained in the same manner but by recording an instantaneous image. The majority of the components of the digital camera are not shown in FIG. 5 for the purposes of clarity. A CCD camera is preferable over, say, a laser camera as images can be recorded from a greater distance.

The data terminal 10 further comprises a keyboard 16. In order to record an image the lens 12 of the data terminal 10 is directed at the scene to be recorded. This is preferably displayed on the visual display screen 14. When a desired image is isolated a button, for example on the keyboard 16, is pressed and a still image recorded.

In the embodiment shown, the data terminal 10 further includes various optional and required components. The principal required component is a wireless signal transmitter 18 which, as discussed in more detail below, relays the recorded image to a remote access point for distribution from that point. Optionally the data terminal 10 further includes a microphone 20 for recording, for example, a verbal description of the recorded scene, a bar code reader 22 allowing alternative or complementary operation of the data terminal 10, a physical interface 24 for downloading of information stored in the data terminal 10 to a terminal to which it is connected by cable or other link and a printer output slot 26 for outputting a hard copy of the image, additional information, or as discussed in more detail below, a bar code symbol representative of the stored image. In addition, as discussed above, the terminal further includes server software allowing creation of a web site at the terminal. The web site can contain, for example, recorded images or sounds from the environment of the terminal together with text input at the keyboard and/or the user's recorded verbal commentary. A further feature that can be incorporated into the terminal is a global positioning system (GPS) of a known type. The GPS communicates with GPS satellites via a suitable antenna (not shown). As a result the specific geographical location of the mobile device can be immediately ascertained. This can be provided as additional information broadcast by the device and can also be used by a central tracking system to ascertain where all the devices are at a given time.

Once again specific details of the various individual components will be well known to the skilled reader and, for the purposes of clarity, are not repeated here.

In order to minimise costs the network architecture is designed to minimise the amount of data traffic over the highest cost communication links. This can be done for example by selecting a communication route which utilises the cheapest available lines. Where this can lead to delay a prioritisation system can be introduced ensuring that communications in respect of which delay is unimportant can be sent on a cost optimised basis whereas those signals for which the speed of transmission is important are sent on a urgency basis. For example where wireless communication gives rise to high costs as against physical interface communication, low priority information can be downloaded physically from the terminal to a cradle to reduce the power and processing burden and general cost burden.

An alternative terminal configuration can be based on the arrangement disclosed in U.S. application Ser. No. 08/691, 263, filed Aug. 2 1996, assigned herewith. That specification describes a modular type terminal having interchangeable data collection modules, together with a detailed discussion of communications between mobile units and the Internet.

The system can be used for coverage of news events. A journalist holding the terminal can store images of a news event, and record a report on the event. A web site can be instantaneously set up at the terminal via the internal server holding the report and other data. Accordingly a user wishing to find out about the news event merely needs to access the site via the network. The address could be known to the user or could be available from a central site on the Internet disclosing where various mobile units are located, and providing their site addresses. It will be seen that the technology could further incorporate a pay-per-view type system whereby the user is automatically billed for accessing the site. It will be seen that many other applications can be envisaged. For example a police report of the scene of an incident, or an insurance operative report can be accessed actually on location at the incident rather than relying on transfer to a stand-alone server for creation of a web site at that level.

According to the embodiment any suitable form of wireless communication between the client/server and the Internet can be utilised. Such systems are well known for roaming units, whereby access points to the Internet arranged to receive communications from mobile units are located at various geographical points. Known algorithms can be used for selecting which access point is the most suitable. The communication can itself be by radio waves or an optical link such as an IRDA Standard Protocol. It will be seen that another of the advantages of the system is that the site is stored at the terminal and need only be down-loaded on demand via the wireless link thus reducing the cost that would be incurred by transferring data continuously. Data that is never requested can be transferred over a less costly connection at a later time.

Figure 4:
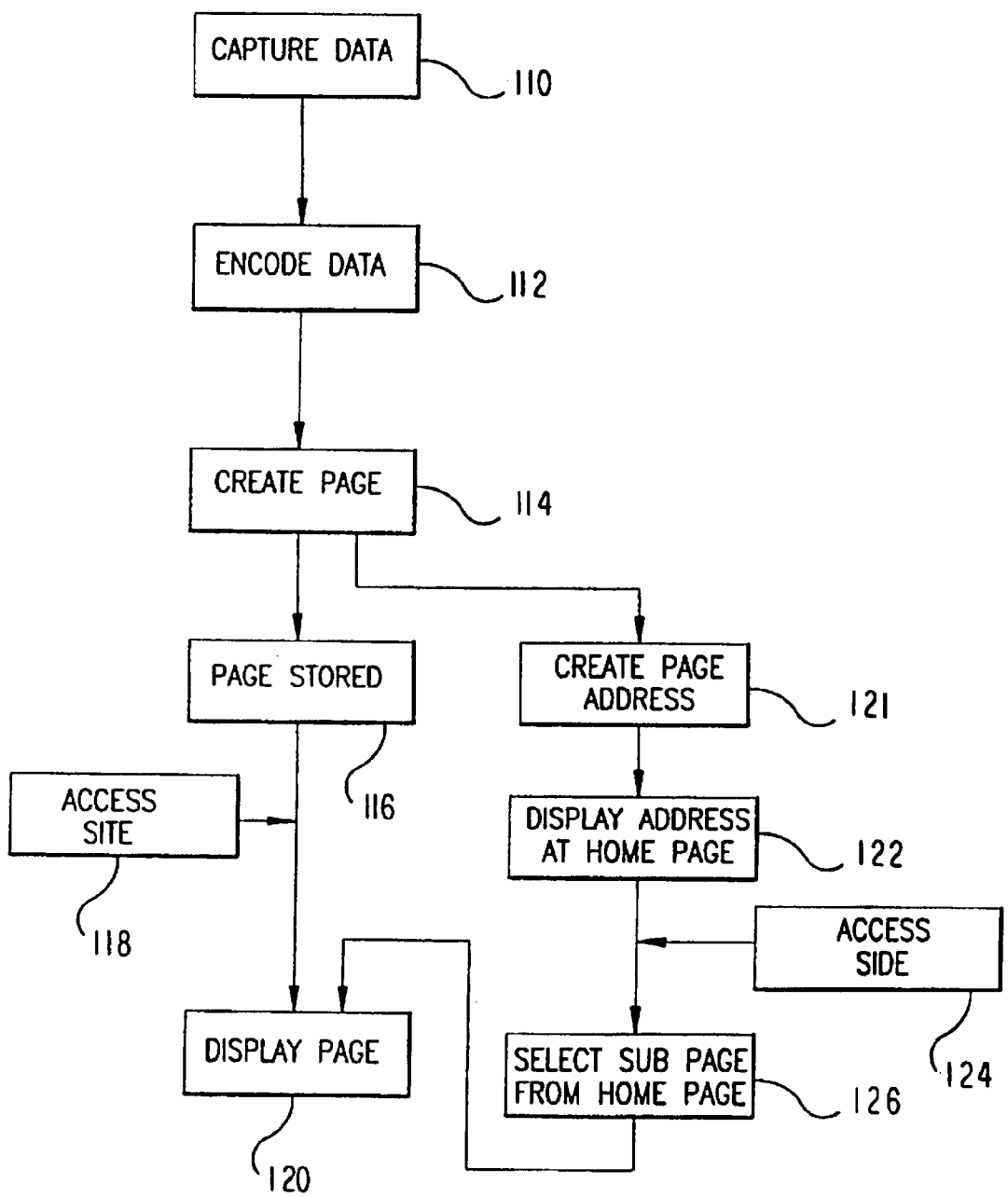
FIG. 4 is a flow diagram representing operation of the present invention.

Referring to FIG. 4 a flow chart of the operation of the terminal 1 is shown. At step 110 the desired data, for example an image or an audio recording is captured. The data is then encoded at step 112 into a suitable format to be rendered as a web page, for example by creating a bit map. At step 114 the encoded data is processed to create a suitable web page according to the desired format, as determined by the server software and any user input. The process can then branch to step 116 where the page is stored at the terminal. When a page access request is received at 118 by a remote user called up the known address for the terminal the page is displayed at the terminal web site. According to an enhanced system, the process branches at 114 also allowing a specific page address to be created for the particular data stored in the given process, at step 121. The address and details of the page stored at the address are displayed on a home page at step 122. This allows a menu to be created for the terminal such that more than one page is available. Accordingly when the site is accessed at 124 by a remote user the remote user has the option of selecting the relevant sub-page displayed at the home page at step 126, allowing display of any desired page, returning to step 120. The system thus allows quick and easy operation with no programming required and in particular no HTML requirement. An instantaneous web page can be set up using the server software, the image to be displayed being stored simply by pointing the terminal at it and "clicking". Once again, the system can be designed with cost optimization in mind, ensuring that a minimum amount of data traffic occupies high-cost communication links.

Figure 6:
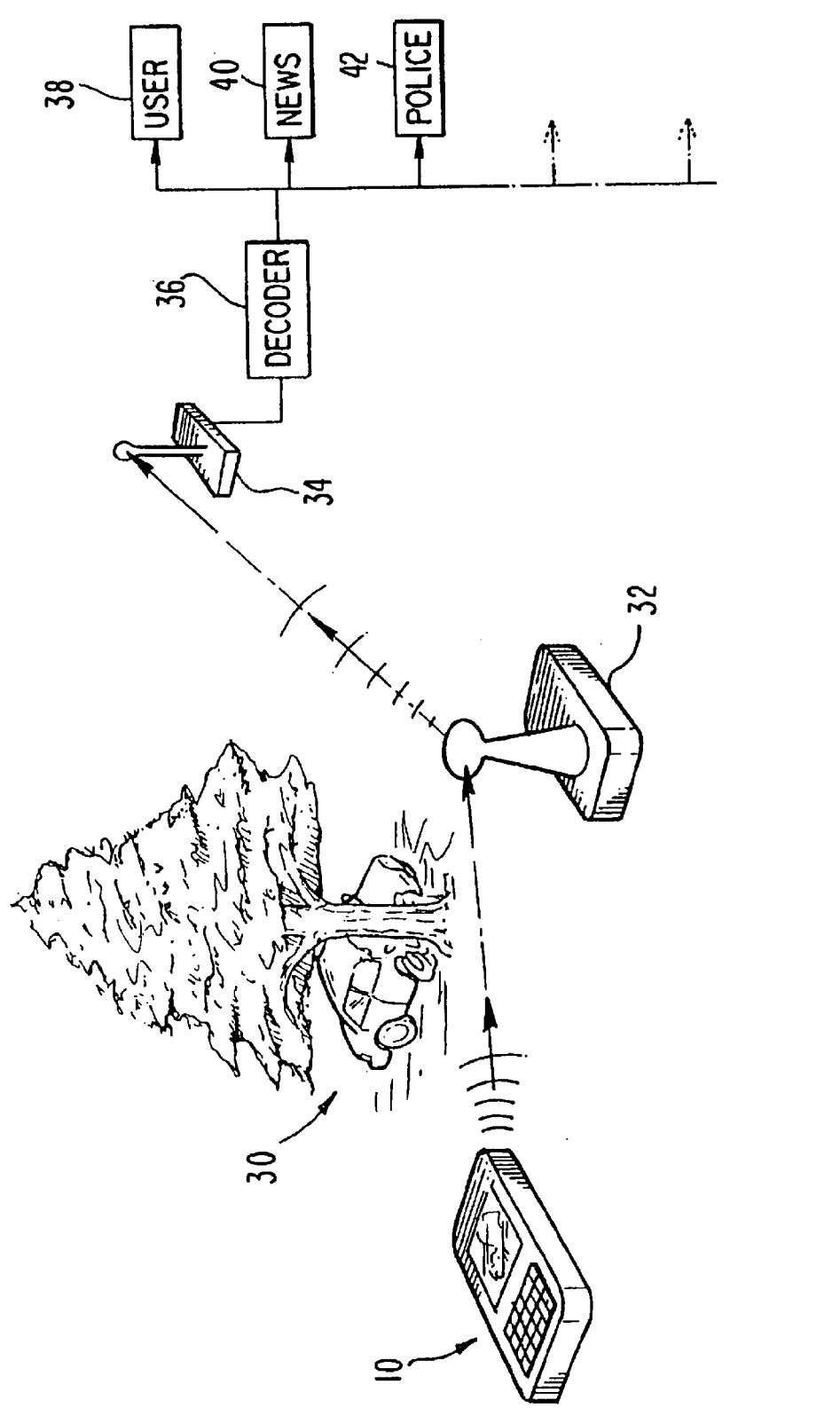
FIG. 6 shows an implementation of the data terminal according to the present invention.

Referring to FIG. 6 one possible implementation of an alternative embodiment of the present invention is shown. Where, for example, the police or other authorities, or an insurance operative wish to record details of a scene shown generally at 30, the image is captured as a still digital camera image by the data terminal 10 in the manner discussed above. The stored image is encoded, for example as a bit stream and the bit stream is transmitted or relayed via the transmitter 18 to a remote point.

In the embodiment shown the image information is relayed from transmitter 18 to an intermediate booster transmitter 32. This can either be one of a network spread across an area or can, for example, be carried in the data terminal user's vehicle or a carrying case. The use of a booster transmitter 32 reduces the broadcast power requirements of the data terminal 10 allowing more space to be dedicated to data storage/processing means or accessories, and increasing the battery life. It will be appreciated that the booster transmitter is, however, optional and in many cases will not be required. Transmission can take place via a RF wireless link microwave or other suitable wireless communication method. Where the vehicle is part of a larger GPS monitored tracking system the arrangement of the present invention can be a module incorporated into the system.

Either the transmitter 18 in the data terminal 10 or the booster transmitter 32 relays the image information to an access point 34 including a receiver for receiving the relayed information signal. The received signal is input to a processor/data storage/decoder device 36. The image can then be transferred to any desired device, for example a central data storage device for the user to access on return to his premises (for example an Intranet or LAN), or a news and information network (such as the Internet) where it is desired to broadcast the image, or to a police or other authorities' information database where it is desired to record and document the image. The transmitted signal from the data terminal 10 may also include information such as the desired destination of the image, additional information relating to the circumstances, encoded information representative of recordings of any verbal messages or recordings of sound messages further explaining the circumstances as recorded by the microphone 20. Information relating to the circumstances, or the destination of the image can be input via keyboard 16.

Where the web page is created on site at the terminal using a internal server, the transmission system described above can equally be used for third party access to the web page.

Figure 7:
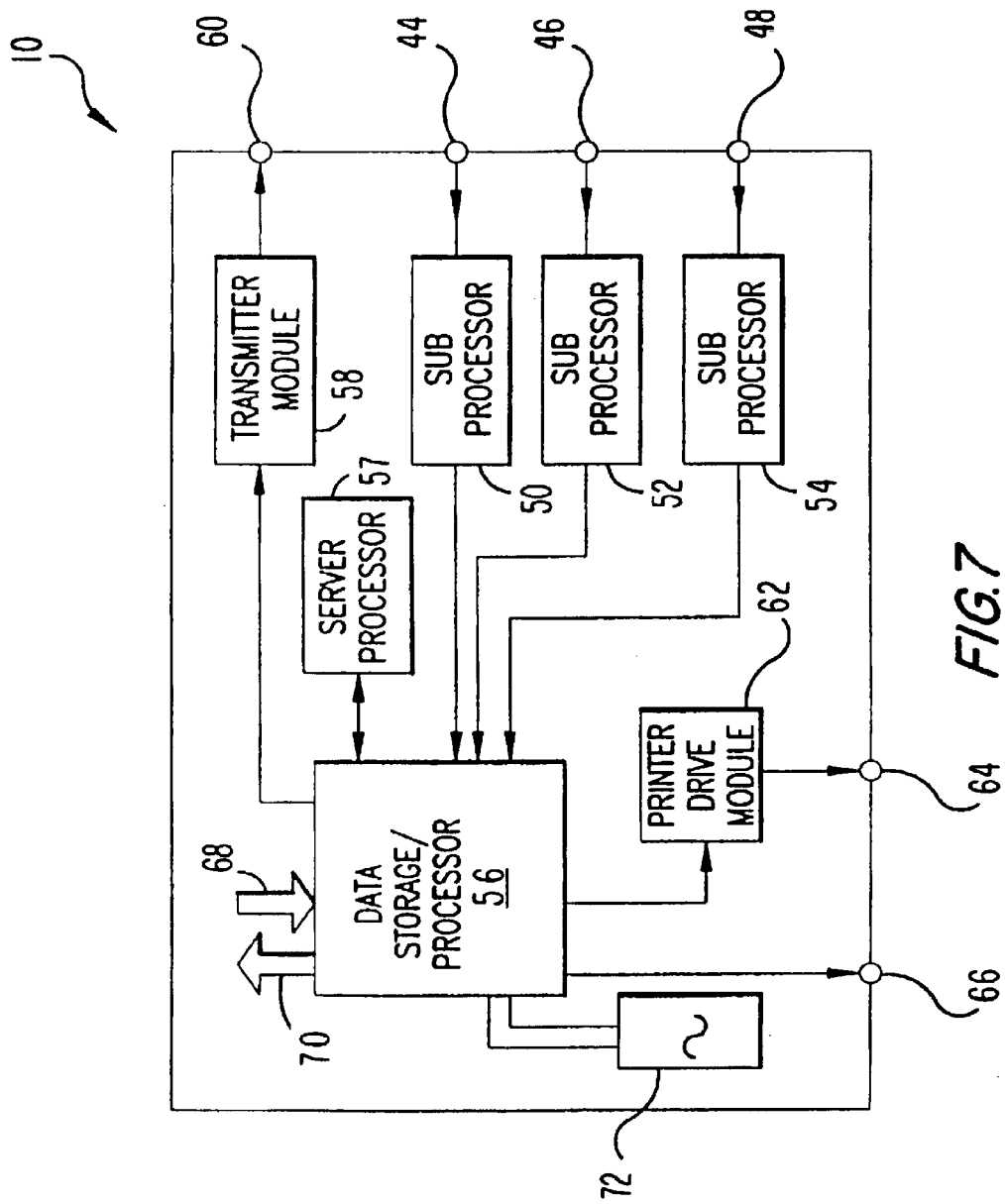
FIG. 7 is a block diagram showing components of the data terminal of FIG. 5.

A block diagram showing the components of the data terminal 10 is illustrated in FIG. 7. The data terminal includes various inputs comprising suitable transducers for converting the input signals to electronic signals. The inputs include the digital camera input 44 including a CCD array transducer, an audio signal input 46 including a microphone transducer and a bar code symbol signal input including, for example, a CCD array. Each of the signals is input to an encoding or digitising sub-processor respectively 50,52,54, and the processed signal from each sub-processor is transferred to a data storage and processing device 56. The data is stored, processed and relayed as appropriate to various outputs. Data relating to the image captured by the digital camera 44 and, as appropriate, any bar code data or audio data is transferred to a transmitter module 58 and is transmitted as described above at output 60. A hard copy of the still image, or, as discussed below, a bar code symbol representative thereof is output via printer drive module 62 and output 64. Where it is desired to download stored information via a physical interface this is done at output 66. In addition the data store/processor 56 receives information input to the keyboard 16 via a line 68 and sends the image from the digital camera input 44 to the visual display screen 14 via line 70. The system as a whole is powered by power supply 72, for example a battery. Where the terminal is configured to create a web page on site, a server can be incorporated in hardware (or software or a combination of hardware and software) as shown at 57.

Accordingly it will be seen that in one aspect the image data can be captured automatically and transmitted to a common database accessible to authorised users. The images could be transported and/or accessed via video servers, collaborative work group software and distributed multimedia, and implemented by desktop video teleconferencing. Processing of the image can be carried out on the raw data once it has been transmitted to the main network, allowing a further reduction in the processing requirements and hence the power and space requirements for the data terminal itself.

A particular advantage of using a digital camera is that the image can be stored at high to medium resolution and transmitted electronically with a minimum of intermediate processing.

It will be seen that a wide range of applications are available, in particular relating to industries generally in which photographic (digital) images are regularly taken in the field. An alternative to the insurance claims documentation application discussed above, where bids/estimates were involved the item in respect of which the bid/estimate is provided, documenting for example the work required on the basis of which the bid or estimate was based could be recorded. Similarly where repair work or improvement work was contemplated, an appraisal could be made taking into account stored images. The system could be used as a general aid to documentation of items or circumstances. As discussed above, the system could be implemented in law enforcement. For example the scene of a crime or an accident could be stored and relayed or accessed. Indeed felons could be photographed and the image compared against a suitable database for identification purposes using known image comparison techniques. The system can also be used as a preliminary aid to more exhaustive documentation of circumstances such as proofing and/or test shots. The data is preferably relayed as determined by a network architecture designed to reduce transmission costs by minimising transmissions over high-cost communication links.

As will be seen for all of the above possible applications and all other applications the system includes particular and significant advantages, in particular providing immediate access to images for third parties privy to the image distribution network, providing access to all users simultaneously as desired, expediting processing time (as a result of immediate accessing), improving accuracy and/or efficiency, as a result of the availability of more precise information in particular in high resolution implementations, and associated cost savings in particular resulting from decreased processing time and improved accuracy.

Yet a further possible implementation of the arrangement would be as a remote fire alarm or smoke detector. A terminal including the basic components of a digital camera or other image recordal means and network connectivity can be permanently or detachably mounted at a zone where it is desired to monitor for fire, smoke, poisonous gases or any other such hazard. The terminal further includes a hazard detector of any suitable type such as a smoke detector, a heat detector, a noxious substance detector or other. All these detectors are well known to the skilled man and do not require further description here. In the case, for example, of a fire alarm terminal, when a heat detector detects that the ambient temperature has risen over a preset limit the terminal is activated to capture a still or moving image of the scene. At the same time the terminal notifies the relevant authorities such as the fire services and the image is transmitted in a manner discussed above to an access point at the fire station. Accordingly the scene can be reviewed and it can be assessed whether a true fire risk exists or whether other activity to which the increase in temperature is attributable can be detected such as cooking activity. As a result false alarms can be to a large extent avoided. It will be seen that a similar approach can be adopted for other hazard detectors, where an image of the scene is transmitted to suitable authorities when a potential risk is first detected for further assessment before full mobilisation.

A further implementation for which the system of the present invention according to a further aspect would be particularly suited and which would benefit from the advantages discussed above is in the field of goods transfer, for example parcel delivery. When a damaged parcel is received there is no way to know immediately the condition of the parcel when shipped. The system of the present invention would, however, be able to acquire the image and transmit it to a remote location or create a suitable web page on site. The image could then be accessed at the receiving depot and compared with the actual received parcel to establish whether the condition had changed in any way. An alternative option would be to print the image information in a bar code format, the bar code itself being attached to the parcel itself. The bar code symbol could be decoded at the receiving depot, once again to compare the image with the received parcel. Evidently a high resolution bar code symbol will be required, for example under protocol PDF 417. The reader shown in FIG. 5 includes the capability for such an arrangement including a printer and printer slot 26.

Figure 8:
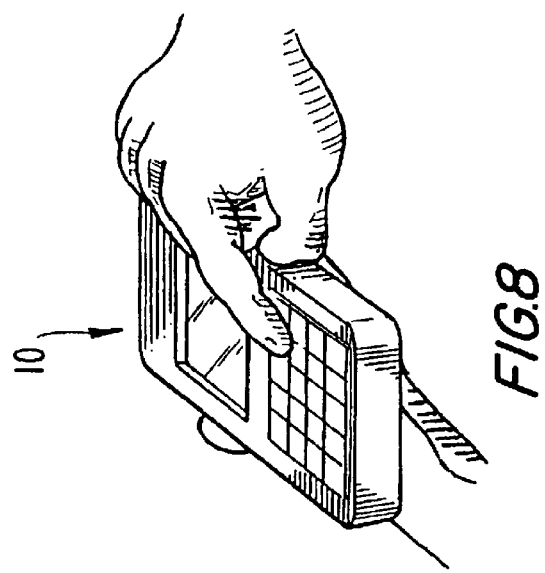
FIG. 8 shows a hand-held data terminal.

It will be appreciated that the embodiments described above relate to specific possible implementation of the invention, and that the invention embraces a number of alternatives. For example, as shown in FIG. 8 the data terminal 10 is configured with ergonomic considerations in mind, fitting comfortably into the palm of the user's hand. As a result the data terminal 10 can be quickly and accurately directed towards an image to be recorded, using the visual display screen to ensure that the image is as desired. At the same time the keyboard can be manipulated comfortably using the user's other hand to capture the image, input additional information and so forth. Alternatively the terminal may be in the form of a conventional camera, or a video camera, or any other appropriate configuration allowing image capture, and, preferably, data input.

The digital camera preferably includes auto focus capabilities and manual zoom capabilities with a separate button/trigger for zooming, which button/trigger may form part of the keyboard or may be provided separately. The manual zoom feature will assist in taking close-ups of the subject to be imaged. As mentioned above, a printer, for example a low density, low quality printer can be included in the data terminal, or provided as an add-on, so that a hard copy of the image is available in the field. As also discussed above, the image could be printed in PDF 417 format for subsequent decoding.

Figure 11:
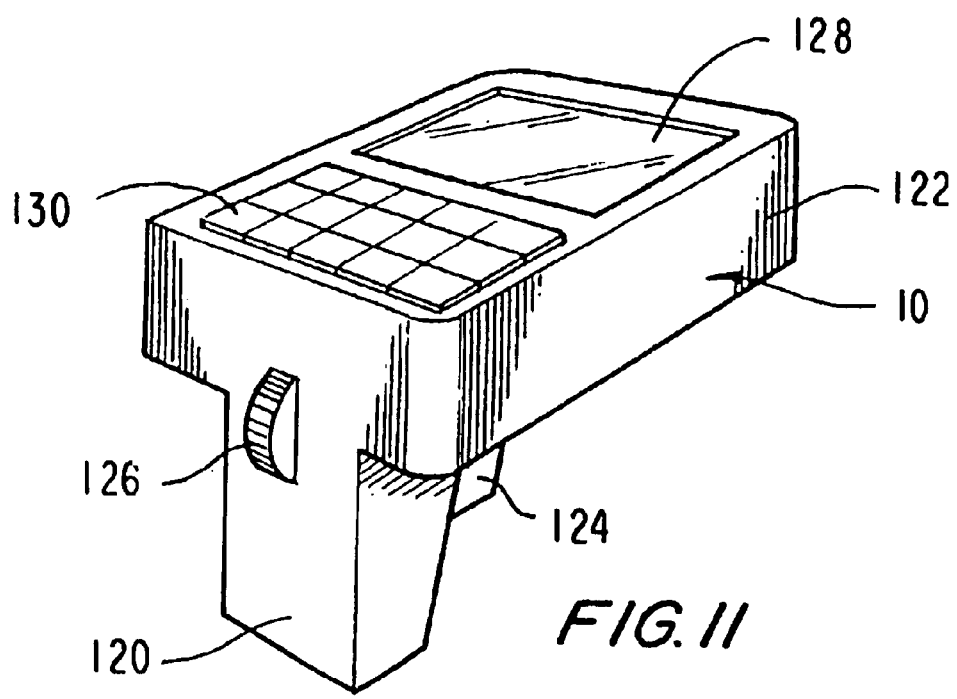
FIG. 11 shows an alternative configuration for the terminal of FIG. 8.

FIG. 11 shows an alternative configuration for a data terminal. The terminal 10 contains generally all of the components discussed in relation to the other embodiments herein. However the terminal 10 is configured in a "point and shoot" design and includes a grip portion 120 and a barrel portion 122. The grip portion is configured to sit comfortably and easily, with optimum balance, in the user's hand and further carries a trigger 124 and a thumb wheel 126. A display 128 and optional keypad 130 are provided on the upper face of the barrel portion 122 to allow easy viewing and input access to the user. The camera lens or other image recordal means are provided on the front face of the barrel portion 122 (not shown) allowing the user simply to point the terminal 10 in the direction it is desired to record in. When the desired scene is viewed on a display 128 capture is effected by activation of the trigger 124. Zoom can be controlled by the thumb wheel 126 which is preferably located for optimum ease of use by the user's thumb when the grip portion 120 is held by the user.

Figure 9:
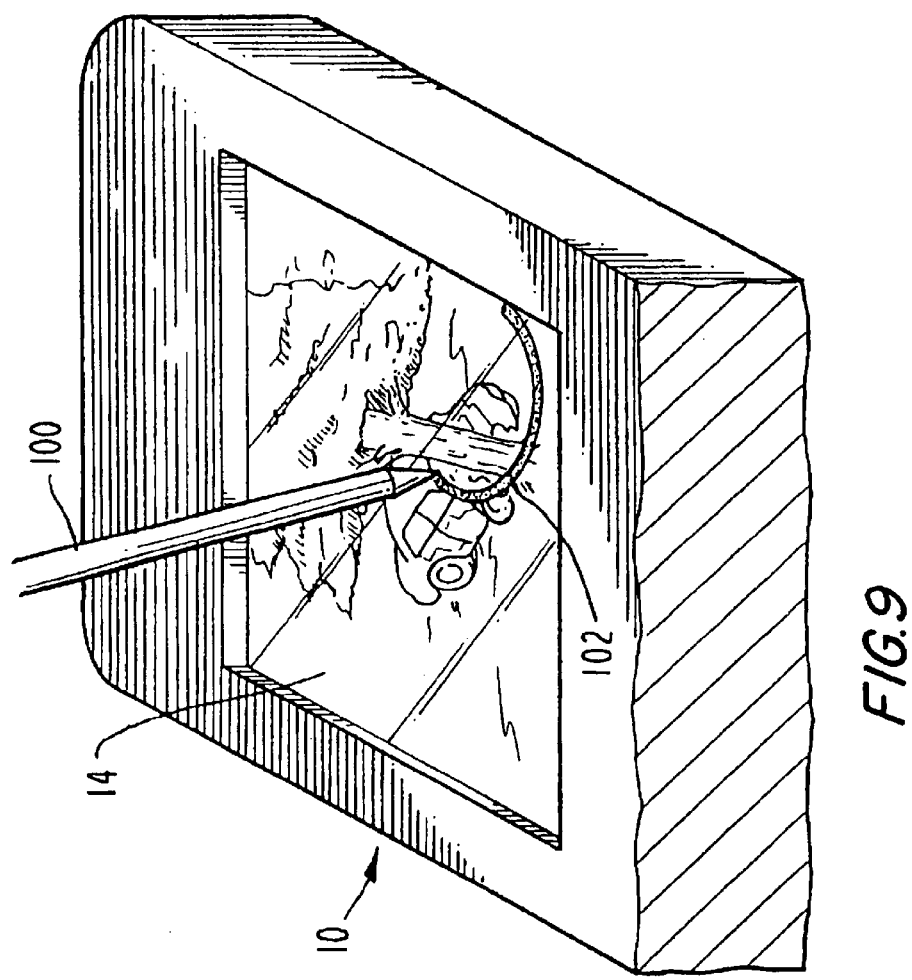
FIG. 9 is a detail of a data terminal according to the present invention having highlighting capabilities.

The processing speed and storage capabilities of the components of the data terminal can of course be determined according to the eventual cost of the system, for example a slower and hence cheaper microprocessor can be incorporated. For more high-end applications the data terminal could additionally include an SRAM card to store the still images. In addition the visual display screen 14 can, as shown in FIG. 9 include LCD (liquid crystal display) capabilities. Accordingly using a suitable pen 100, the image can be altered for example by ringing or otherwise highlighting areas of interest, the alterations being represented on the LCD display as 102 in FIG. 9. The alterations can be deleted or revised additionally using the keyboard as appropriate.

The range of implementations, and the speed and efficiency of the system can be further enhanced by also incorporating bar code reader capabilities into, or in conjunction with, the data terminal. The construction and applications of bar code readers will be well known to the skilled man and do not require a detailed description here. Briefly, however, a bar code symbol comprises one or more rows of light and dark regions, typically in the form of rectangles or, for the case of two-dimensional codes, in the form of a two-dimensional array of light and dark spaces. The dimensions of the dark and light regions indicate encoded information to be read. A bar code symbol reader illuminates the symbol using reading beam generating means and senses light reflective on the coded regions using reading beam detecting means to detect the dimensions of the coded regions. A decoder decodes the detected encoded information. Known symbols which include, for example, UPC/EAN, Coder 128, Codabar and Interleaved 2 of 5.

One known type of bar code reader comprises a data wand as disclosed in U.S. Pat. No. 4,471,218, incorporated herein by reference.

Figure 10:
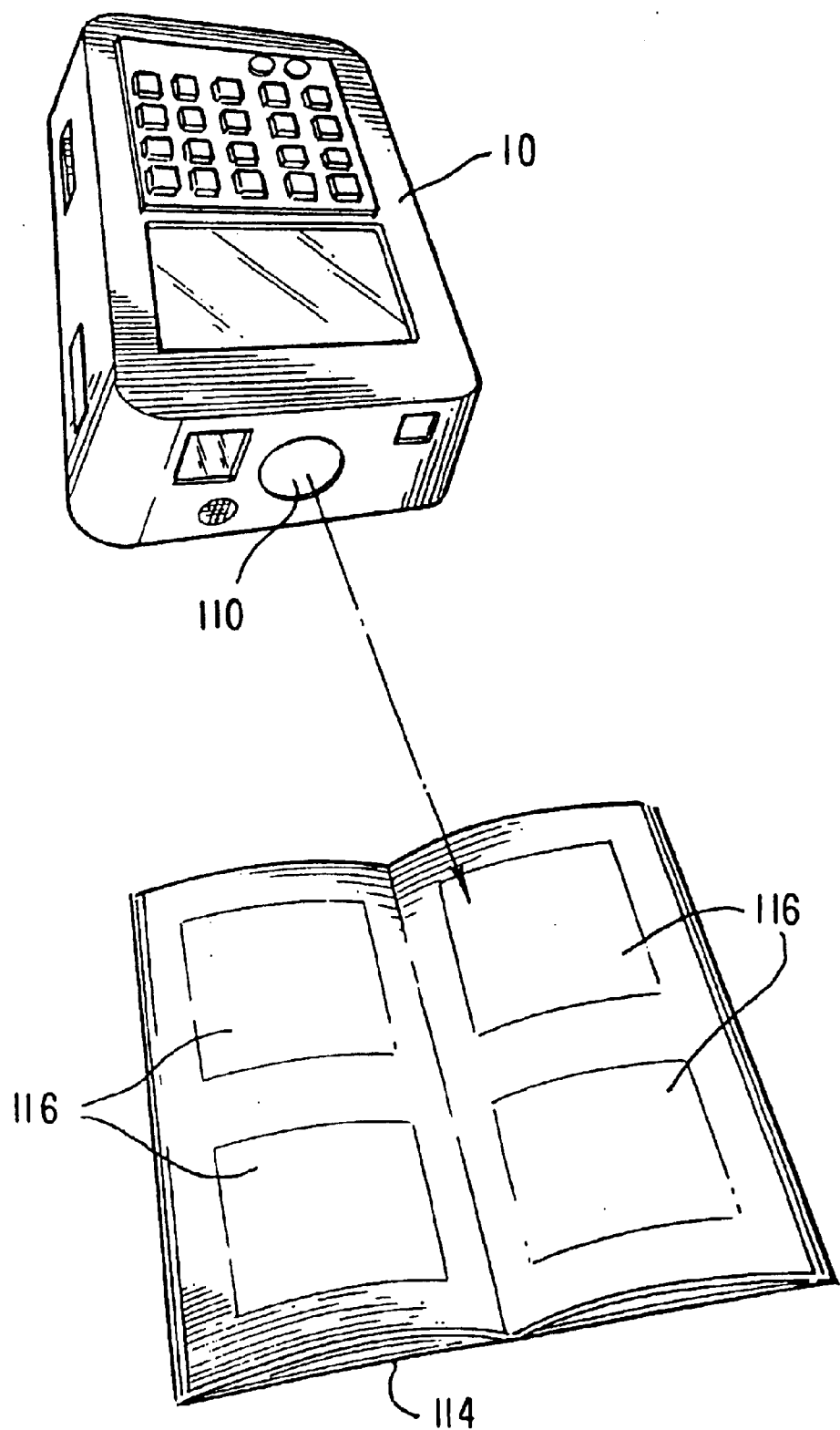
FIG. 10 shows a data terminal according to another aspect of the invention.

FIG. 10 shows a data terminal 10 of the type described herein above further incorporating an optical reader 110 incorporated in the data terminal 10. The reader 110 includes reading beam generating and detecting means and the data terminal 10 includes processing means for decoding the detected encoded information. The reader 110 may comprise either a "flying-spot" laser scanner including means for scanning the reading beam or a "field of view" optical reader including a CCD array as detector. Both types of reader will be well known to the skilled reader and a full description of the components and operation is not provided here.

It will be appreciated that a wide range of implementations can be envisaged for the data terminal 10 shown in FIG. 10. In particular it may be useful in many circumstances to be able to read information encoded in bar codes to adduce additional information to that retrieved by the data terminal from the external environment.

A particularly advantageous embodiment is shown in FIG. 10. In particular a book or other printed matter 114 is provided which can be carried by the user including printed bar codes 116 which are read by the reader 110 and the information contained therein utilised by the data terminal 10. As discussed in more detail below, the data terminal 10 in fact comprises an Internet server capable of creating a web site at the data terminal carrying, for example, information relating to the external environment around the data terminal for access by users elsewhere on the Internet. In such circumstances the terminal might conventionally wish to download executable code from a host machine using an agent implementation language such as Java (a trade mark). This system can be cumbersome and time consuming in view of the level of communications required between the client and the host. The present invention solves this problem by storing the executable code (applets) in the form of two-dimensional high density bar codes 116 in the book 114. Each bar code symbol 116 is identified by a suitable short title or other identifying information in the book. When it is required to access an applet the user is merely required to read the two-dimensional bar code using the bar code reader 110, and the executable code is immediately downloaded to the data terminal 10 for the data terminal 10 to use it as appropriate.

The invention allows the user to carry a conventional book—for example having five hundred pages of 2-D applet codes. Such a book would not be cumbersome and would indeed be attractive to many users. The system allows greatly accelerated downloading of applets in as little as fifteen seconds. Conventional downloading systems would still be waiting for connection to the host in that range of time scale.

It will be appreciated that any suitable executable code could be stored in a desired language in the two-dimensional bar codes 116. A wide range of different applets could of course be stored according to this system and indexed appropriately. Indeed the system could be used for fixed or dedicated clients as well as the remote, mobile client data terminal shown in FIG. 10.

It will be seen that the data terminal can communicate with any suitable data network, for example an access point to the Internet, or to a closed dedicated system relating to the user or to which the user subscribes together with other users. Communication can be by way of RF communication or, if appropriate, infrared or microwave communication, or any other suitable wireless communication method.

It will be appreciated that any of the features discussed in relation to one embodiment can, as appropriate, be incorporated in any other embodiment without departing from the teaching of the present specification.

Without further analysis, the foregoing will so fully reveal the gist of the present invention that others can readily adapt to various applications without omitting features that, of the standpoint of prior art, fairly constitute essential characteristics of the generic or specific aspects of the invention and, therefore, such adaptions should and are intended to be compounded within the meaning and range of equivalents of the following claims.

What is claimed is:

1. A data capture and relay device, comprising:
   a) a camera including a two-dimensional image sensor for recording a two-dimensional image of a target to be recorded;
   b) a microphone for recording a verbal description of the target;
   c) a memory for storing the two-dimensional image recorded by the image sensor and the verbal description recorded by the microphone;
   d) a server in the device for creating a local internet web site at which the stored, recorded two-dimensional image and the stored, recorded verbal description are accessible, and for creating a site address; and e) a transmitter for transmitting at least one of the stored, recorded two-dimensional image and the stored, recorded verbal description to a host remote from the data capture and relay device via a wireless medium upon an access request by the host to access the local web site via the site address.

2. The device of claim 1, wherein the device includes a housing located at a geographical location, and operative for supporting the camera, the microphone, the memory, the server and the transmitter; and wherein the camera is operative for recording the two-dimensional image of at least one of an environmental scene and an object at the geographical location.

3. The device of claim 1, the device includes a mobile housing for supporting the camera, the microphone, the memory, the server and the transmitter; and further comprising a global positioning system receiver supported by the housing for determining a current location of the mobile housing.

4. A method of capturing and relaying data, comprising the steps of:

a) recording a two-dimensional image of a target to be recorded by using a two-dimensional image sensor of a camera;

b) recording a verbal description of the target by using a microphone;

c) storing the two-dimensional image recorded by the image sensor and the verbal description recorded by the microphone;

d) creating a local internet web site at which the stored, recorded two-dimensional image and the stored, recorded verbal description are accessible, and creating a site address; and e) transmitting at least one of the stored, recorded two-dimensional image and the stored, recorded verbal description to a remote host via a wireless medium upon receiving an access request by the host to access the local web site via the site address.

* * * * *